(12) United States Patent
Gautron

(10) Patent No.: US 12,456,261 B2
(45) Date of Patent: Oct. 28, 2025

(54) HASH CELL BOUNDARY SHIFTING FOR LIGHT TRANSPORT SIMULATION SYSTEMS AND APPLICATIONS

(71) Applicant: Nvidia Corporation, Santa Clara, CA (US)

(72) Inventor: Pascal Gautron, Speracedes (FR)

(73) Assignee: Nvidia Corporation, Santa Clara, CA (US)

( * ) Notice: Subject to any disclaimer, the term of this patent is extended or adjusted under 35 U.S.C. 154(b) by 322 days.

(21) Appl. No.: 18/170,095

(22) Filed: Feb. 16, 2023

(65) Prior Publication Data
US 2023/0298274 A1 Sep. 21, 2023

Related U.S. Application Data

(60) Provisional application No. 63/321,771, filed on Mar. 21, 2022.

(51) Int. Cl.
G06T 19/00 (2011.01)
G06F 30/20 (2020.01)
G06T 7/586 (2017.01)

(52) U.S. Cl.
CPC ............ G06T 19/003 (2013.01); G06F 30/20 (2020.01); G06T 7/586 (2017.01)

(58) Field of Classification Search
CPC ..... G06T 19/003; G06T 7/586; G06T 15/506; G06T 15/06; G06F 30/20
See application file for complete search history.

(56) References Cited

U.S. PATENT DOCUMENTS

| | | | | |
|---|---|---|---|---|
| 7,002,571 B2* | 2/2006 | Lake | ................ | G06T 17/005 345/420 |
| 2007/0057938 A1* | 3/2007 | Usami | ................ | G06T 17/20 345/418 |
| 2017/0039759 A1* | 2/2017 | Huet | ................ | B33Y 50/02 |

OTHER PUBLICATIONS

Binder, N., Fricke, S., & Keller, A. (2018). Fast path space filtering by jittered spatial hashing. In ACM SIGGRAPH 2018 Talks (pp. 1-2). (Year: 2018).*
Binder, N., Fricke, S., & Keller, A. (Aug. 2020). Massively parallel path space filtering. In International Conference on Monte Carlo and Quasi-Monte Carlo Methods in Scientific Computing (pp. 149-168). Cham: Springer International Publishing. (Year: 2020).*
Lefebvre, S., & Hoppe, H. (2006). Perfect spatial hashing. ACM Transactions on Graphics (TOG), 25(3), 579-588. (Year: 2006).*
García, I., Lefebvre, S., Hornus, S., & Lasram, A. (2011). Coherent parallel hashing. ACM Transactions on Graphics (TOG), 30(6), 1-8. (Year: 2011).*

(Continued)

*Primary Examiner* — Daniel F Hajnik
*Assistant Examiner* — Adeel Bashir
(74) *Attorney, Agent, or Firm* — Hogan Lovells US LLP

(57) ABSTRACT

Systems and methods implement a technique for altering the shape of the cells by shifting coordinates of points along cell boundaries using a set of periodic functions. To avoid having cell boundaries along the scene surfaces, wavelengths of those periodic functions are selected so they are not a multiple of an original discretization. The coordinates may be shifted along different axes of the cells and may generate different cells having a variety of different outlines to reduce a likelihood of a cell boundary being positioned along a scene boundary.

19 Claims, 11 Drawing Sheets

(56) References Cited

OTHER PUBLICATIONS

Nießner, M., Zollhöfer, M., Izadi, S., & Stamminger, M. (2013). Real-time 3D reconstruction at scale using voxel hashing. ACM Transactions on Graphics (ToG), 32(6), 1-11. (Year: 2013).*

Cazals, F., & Puech, C. (Aug. 1997). Bucket-like space partitioning data structures with applications to ray-tracing. In Proceedings of the thirteenth annual symposium on Computational geometry (pp. 11-20). (Year: 1997).*

Gautron, P. (Aug. 2020). Real-time ray-traced ambient occlusion of complex scenes using spatial hashing. In Special Interest Group on Computer Graphics and Interactive Techniques Conference Talks (pp. 1-2). (Year: 2020).*

* cited by examiner

HASH CELL BOUNDARY SHIFTING FOR LIGHT TRANSPORT SIMULATION SYSTEMS AND APPLICATIONS

CROSS-REFERENCE TO RELATED APPLICATIONS

This application claims priority to and the benefit of U.S. Provisional Patent Application No. 63/321,771, filed Mar. 21, 2022, titled "HASH CELL BOUNDARY SHIFTING FOR ALIAS-FREE SPATIAL HASHING FOR LIGHT TRANSPORT SIMULATION SYSTEMS AND APPLICATIONS," the full disclosure of which is hereby incorporated in its entirety for all purposes.

BACKGROUND

Light transport simulation is a field of technology that includes a number of techniques (e.g., ray tracing, ray marching, path tracing, etc.) used to render images by simulating paths from light sources (including reflections and refractions) in a virtual environment and simulating the effects of the light particles' interactions with virtual objects. Ray tracing techniques are one type of light transport simulation, and may be used to simulate a variety of optical effects—such as shadows, reflections and refractions, scattering phenomenon, and dispersion phenomenon (such as chromatic aberration). Performing light transport simulation tasks—such as ray tracing—for each of these effects with respect to each pixel, particularly in parallel, can require an unavailable or impractical amount of resource capacity for many different applications. Simply reducing the number of rays or pixels processed can result in an appearance that is not as accurate or realistic as desired. Techniques such as spatial and/or temporal denoising are sometimes applied to increase the efficiency of light transport simulation. However, these temporal image denoising techniques are generally applied in image-space, hence requiring temporal reprojection in an attempt to match visible points across frames. Unfortunately, reprojection can introduce visual artifacts due to reprojection approximations and strong dynamic changes in occlusion.

Spatial Hashing is a practical tool to efficiently store and retrieve sparse spatial data in massively parallel environments. In typical spatial hashing techniques, for any point in a three-dimensional (3D) scene, a hash key is typically obtained by discretizing the 3D coordinates of that point, and successively applying an integer hash function H. If the discretized coordinates are X, Y, Z, a hash entry index can be I=H(Z+H(Y+H(X))). Further attributes such as the surface normal can be added in a similar fashion.

An impactful issue with this approach is the required discretization. For example, when considering a surface lying at the boundary between two hash entries with indices I1 and I2, and due to floating-point errors, the indices of the points on this surface will randomly be either I1 or I2. If the lighting estimates stored in the two corresponding hash cells are different, this results in visible artifacts (e.g., per-pixel discrepancies, flickering), similar to the so-called Z-fighting encountered when rasterizing two overlapping surfaces.

A workaround to this problem uses jittering: instead of using a simple discretization of the coordinates, a pseudo-random number (different for each frame) is added to each coordinate to smooth those effects. However, this introduces some per-pixel noise that requires resolving, either using temporal accumulation or screen-space filtering. The former limits the usage of this technique to offline rendering, while the latter tends to introduce visible blurring of the fine image features, making this approach ill-suited for real time or near real time rendering of highly detailed (e.g., computer aided design (CAD)) assets. Another workaround is to use overlapping hash cells, which can solve this problem by accumulating data into both cells, but comes at the expense of increased rendering times due to additional memory writes and lookups.

BRIEF DESCRIPTION OF THE DRAWINGS

Various embodiments in accordance with the present disclosure will be described with reference to the drawings, in which.

DETAILED DESCRIPTION

Approaches in accordance with various embodiments overcome these and other deficiencies by providing systems and methods for altering a shape of hash cells used for spatial hashing. Specifically, embodiments provide an improved way to define cell shapes to reduce a likelihood of feature matching. When computing the cell shapes, coordinates are shifted, for example by using periodic functions to define one or more boundaries of the cell shapes, along each coordinate axis of the hash cells. Application of this method provides hash cells that include edges that do not lie on the same plane as neighboring hash cells. Accordingly, hash cells with more complex shapes and contact points that are not coplanar are used for light transport simulations. Different periodic functions, wavelengths, and/or the like can be selected for each axial direction of the cells. As such, a first function may be used for an X-direction, a second function may be used for a Y-direction, and a third function may be used for a Z-direction, where two or more (e.g., each) of the first, second, and third functions are different. But in other embodiments, a common function may be used for each of the axial directions of the cells. By changing the shapes of the cell boundaries, there is a reduced likelihood of visible artifacts (e.g., jittering, flickering, noise generally) caused by floating-point errors that may lead to different lighting estimates between the hash cells. Furthermore, systems and methods may be extended to applications beyond light transport simulation, such as various applications related to spatial storage. As an example, data stored in one or more hash cells may be a result of mechanical stimulation, statistical analysis, and/or the like. Additionally, while embodiments may be described in term of light transport simulations in 3D space, systems and methods may be extended to n-dimensions (nD).

Various other such functions can be used as well within the scope of the various embodiments as would be apparent to one of ordinary skill in the art in light of the teachings and suggestions contained herein.

Figure 1A:
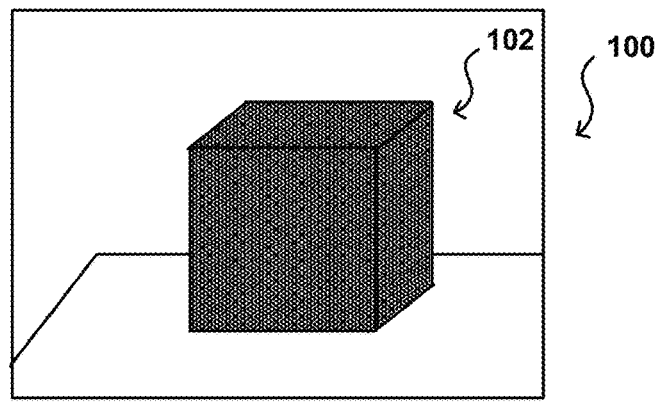
FIGS. 1A, 1B, and 1C illustrate images containing flickering artifacts, in accordance with various embodiments.
Figure 1B:
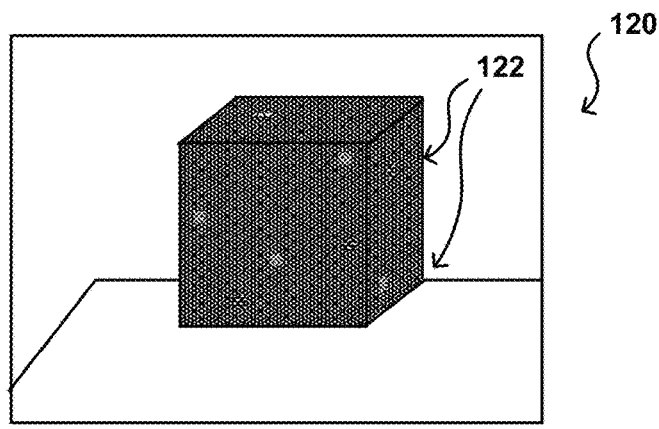
Figure 1C:
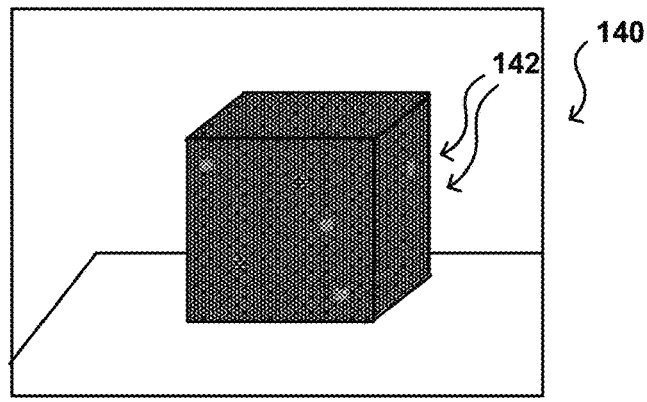

FIGS. 1A-1C illustrate an example of flickering artifacts in a sequence of images or video frames. In a first image 100 in FIG. 1A, a cube 102 is illustrated that is illuminated by one or more virtual light sources in a scene. As mentioned, light simulation can be used to determine how to light or shade each pixel of this cube, which includes determining a color or pixel value based at least on an estimation of a computed integral, such as for an amount of illumination at that point on the cube. Such a simulation can be used to determine other information as well, as may relate to global illumination, ambient occlusion, shader effects, and/or the like. It should be understood that a cube-type object may not frequently exhibit flickering as illustrated, but this example is presented for simplicity of explanation. Since it will not be practical in many instances to sample all incoming light rays or to compute the integral analytically for all pixels, particularly for time-sensitive applications such as online gaming, AR/VR/MR applications, etc., some amount of sampling is typically performed that can serve as a representative measure of an aspect such as illumination, for example, that can then be applied to nearby pixels as well. This can include applying a representative illumination value to pixels in a hash cell of an object. As illustrated in the subsequent images 120, 140 of FIGS. 1B and 1C, respectively, however, sampling different rays when generating different images or video frames can result in different amounts of representative illumination being determined, which can cause pixels within different hash cells 122, 142 to have slightly different shading between frames. This frequent adjustment in color is often referred to as flickering, an effect of which can depend at least on differences in illumination values between different rays that are incident on a given pixel location.

Approaches in accordance with various embodiments can be used to generate content that is substantially free of at least certain types of artifacts, where this generated content may include one or more images, video, texture maps, augmented reality (AR), virtual reality (VR) and/or mixed reality (MR) content, or other such two- or three-dimensional content, as well as other types of output such as, for example, one or more light probes. Embodiments of the present disclosure relate to spatial hashing, which partitions the space into a number of cells. The discretization produced by the partitioning generates axis-aligned cubic cells, which most likely align with some of the scene features.

One or more embodiments implement a technique for altering the shape of the cells to reduce the likelihood of matching those features. In one or more embodiments, the coordinates of the points are shifted using a set of periodic functions, one for each coordinate axis. To avoid having cell boundaries along the scene surfaces, the wavelengths of those periodic functions are selected so they are not a multiple of the original discretization. As a result, the points at the boundary of 8 cells (in 3D) do not lie on the same plane. For example, those periodic functions can be defined for a point p as:

$$fX = \sin(p.x * 2 * PI/(cellSize/3.0))$$

$$fY = \sin(p.y * 2 * PI/(cellSize/5.0))$$

$$fZ = \sin(p.z * 2 * PI/(cellSize/7.0))$$

Then, the point p is shifted as follows:

$$p.x = p.x + (fY + fZ) * a$$

$$p.y = p.y + (fX + fZ) * a$$

$$p.z = p.z + (fX + fY) * a$$

where a is a small fraction of the cell size, e.g., a=cellSize*0.1. The computation of the hash index is then carried on as in the original spatial hashing method. As a result, the edges of the hash cells have a much more complex shape and the contact points of the cells are no longer coplanar. This approach reduces the likelihood of visible artifacts since the distance between surfaces and cell boundaries may be larger than floating-point errors. Furthermore, this technique is easy to implement and does not introduce noise, while having negligible cost.

Figure 2A:
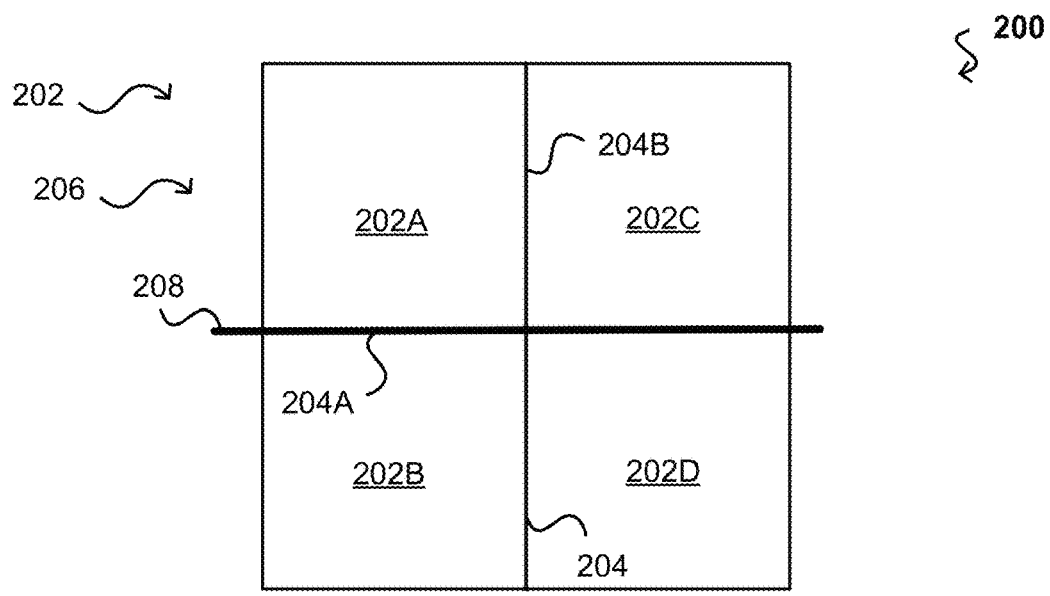
FIGS. 2A and 2B illustrate example representations of hash cells positioned along a common plane, according to at least one embodiment.

At least some embodiments present herein provide the ability to modify a shape of a hash cell edge using a periodic function or wavelength so that edges of hash cells are not aligned on the same plane as neighboring hash cells to address the problems associated with aligned hash cells, as shown in FIG. 2A. FIG. 2A illustrates a schematic representation 200 of four cells 202A-202D that are arranged adjacent to one another such that at least one edge 204 is in contact with an adjacent edge of another cell to form a boundary between the cells. In this example, a first cell 202A contacts a second cell 202B along an edge 204A. As a result, the edge 204A may be referred to as a boundary between the first cell 202A and the second cell 202B. In certain embodiments, the edge 204A may refer to a region or area including respective edges of the first cell 202A and the second cell 202B with at least some overlap. That is, the edge 204A may not be a direct alignment between the cells 202A, 202B and portions of the first cell 202A may overlap portions of the second cell 202B and/or portions of the second cell 202B may overlap portions of the first cell 202A. Similarly, the first cell 202A contacts (or at least partially overlaps) a third cell 202C along an edge 204B (a boundary), and so forth for the relationships between the remaining cells 202. These cells 202 are representative of one or more faces 206 of voxels positioned within three-dimensional (3D) space, but have been simplified to illustrate the arrangement in two dimensions (e.g., a top view or a side view, among other options). As described herein, examples of 3D and 2D space are provided for illustrative purposes, as various techniques may be extended into nD space.

The edges 204 in this representation may be described as being planar or flat with an index=H(p). In other words, the edges 204 are positioned so that they are on a common plane 208 with a neighboring hash cell. When performing light transport simulations, there may be flickering or jittering due to sampling between different cells 202 along the edge 204, as noted above. For example, in a first frame, sampling may be from the first cell 202A, but in the second frame, sampling may be from the second cell 202B. This may lead to different colors being rendered between subsequent frames, which may lead to undesirable artifacts within the image, as noted above. Such artifacts may be more apparent when the common plane 208 corresponds to an edge or other sharp feature within the image, such as an edge of an object within the image.

Figure 2B:
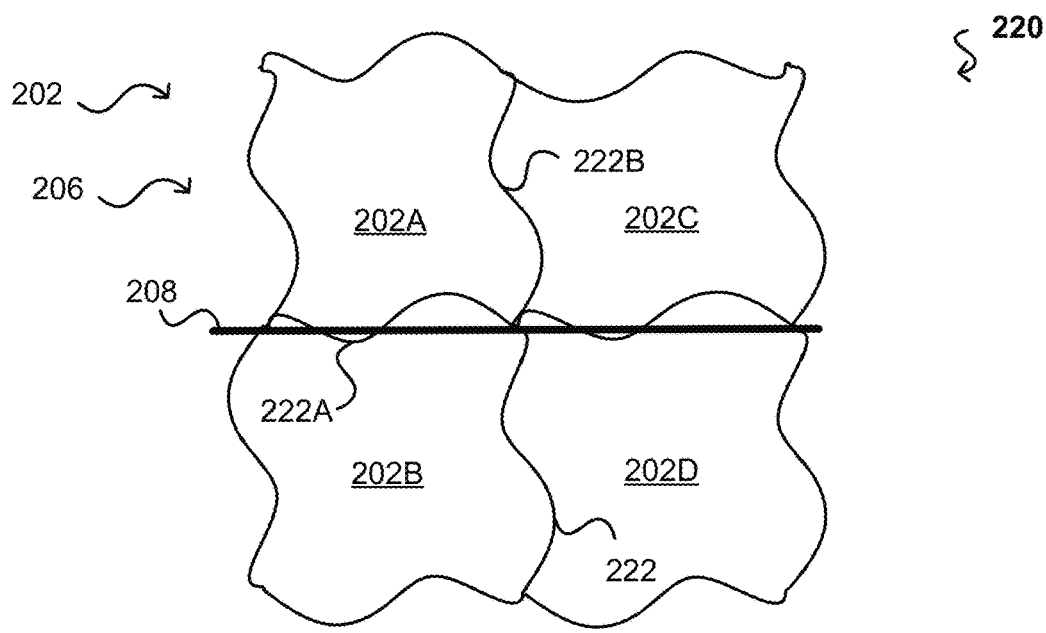

FIG. 2B illustrates a schematic representation 220 where the edges 204 have been modified, which may be referred to as being periodically shifted, to form shifted edges 222 that are positioned so that the respective shifted edges 222 are not positioned on the common plane 208 with respect to adjacent cells 202. The shape of the shifted edges 222 is shown by way of example only and is not intended to limit the scope of the present disclosure, as a variety of different shapes and configurations may be used. For example, as noted above, the edges 222 may be shifted using a sine wave, a cosine wave, and/or any other repeating waveform or equation. Furthermore, different edges 204 may be shifted differently. For example, the first edge 204A may be shifted using a sine wave while the second edge 204B may be shifted using a cosine wave. In at least one embodiment, the edges 204 have an index=H(PeriodicShift(p)), where PeriodicShift is any reasonable function that may generate a repeating pattern. For example, trigonometric functions, complex variables, and/or others may be incorporated within the scope of the present disclosure.

The representation 220 shows the respective faces 206 within a two-dimensional view, but the edges 204 may be shifted along three dimensions, such as along each of the X, Y, and Z axes for a voxel. Additionally, different frequencies or functions may be used for each of the axes. Furthermore, the illustrated shifted edges 222 may be used with any voxels within the image. Edge locations and other potential areas that may result in a greater likelihood of artifacts may not be known prior to voxel formation. However, voxels may be defined by an equation, such that, upon generation, the shifted edges 222 may be used for one or more voxels within an image (e.g., each voxel, a percentage of voxels, etc.) to account for potential areas where artifacts may be more likely to form. Accordingly, various embodiments may incorporate the technique to generate the shifted edges 222 into one or more renderers that may use spatial hashing.

Figure 3:
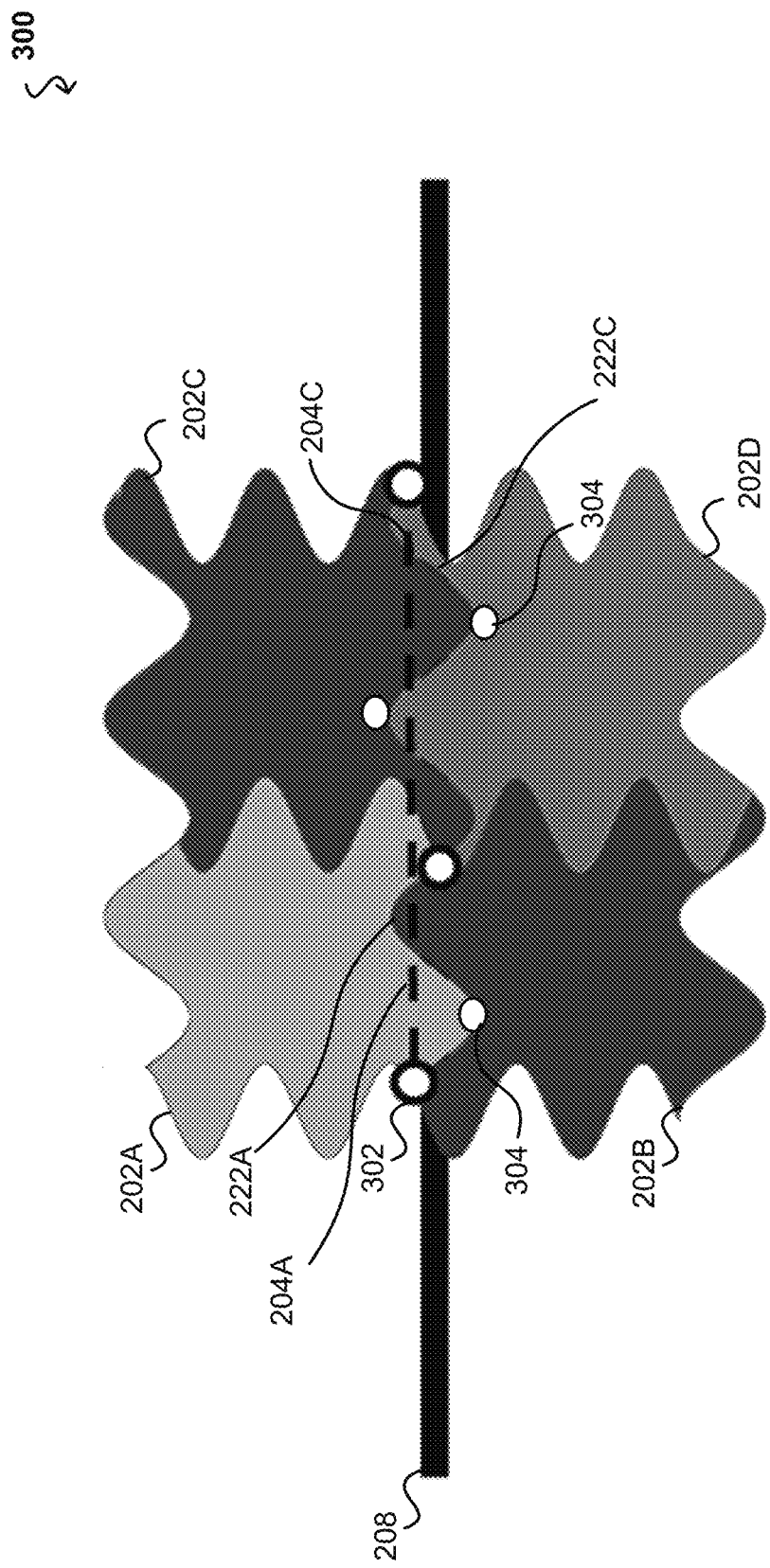
FIG. 3 illustrates an example of hash cells with shifted edges, according to at least one embodiment.

FIG. 3 is a schematic representation 300 of the cells 202, where the edges 204 have been shifted to generate shifted edges 222 that incorporate one or more functions to generate a shape of the shifted edges 222—which in this example correspond to a sine wave. In at least one embodiment, a total volume and/or size of the voxels may be set, and then respective lengths of the shifted edges 222 may be determined so that a total volume and/or size of the voxel equals the predetermined value. However, in other embodiments, edge lengths may be predetermined such that the voxel volume is a function of the edge lengths.

In this example, the common plane 208 is illustrated as a horizontal line that extends along, or is associated with, the edge 204A between the first cell 202A and the second cell 204B and the edge 204C between the third cell 204C and the fourth cell 204D. The edges 204A, 204C are represented by a dashed line that extends along the common plane 208, which as noted above, may correspond to an edge or feature associated with a representative object within an image to be rendered. The shifted edges 222A, 222C are also shown.

To illustrate the different arrangement of the edges 204 and shifted edges 222, points 302 are positioned along the edges 204A, 204C that correspond to the common plane. As shown, these points 302 are substantially co-planar with one another, and as a result, sampling of these points, or points around them, may lead to flickering or artifacts due to randomly sampling between different adjacent cells. In contrast, the points 304 are positioned farther away from the common plane 208 than the points 302. Accordingly, during light transport simulations, there may be a reduced likelihood of flickering or other artifacts because the distance between the surface and cell boundaries may be larger than floating-point errors. Furthermore, various advantages described herein may also extend to various other operations that use spatial storage.

Figure 4:
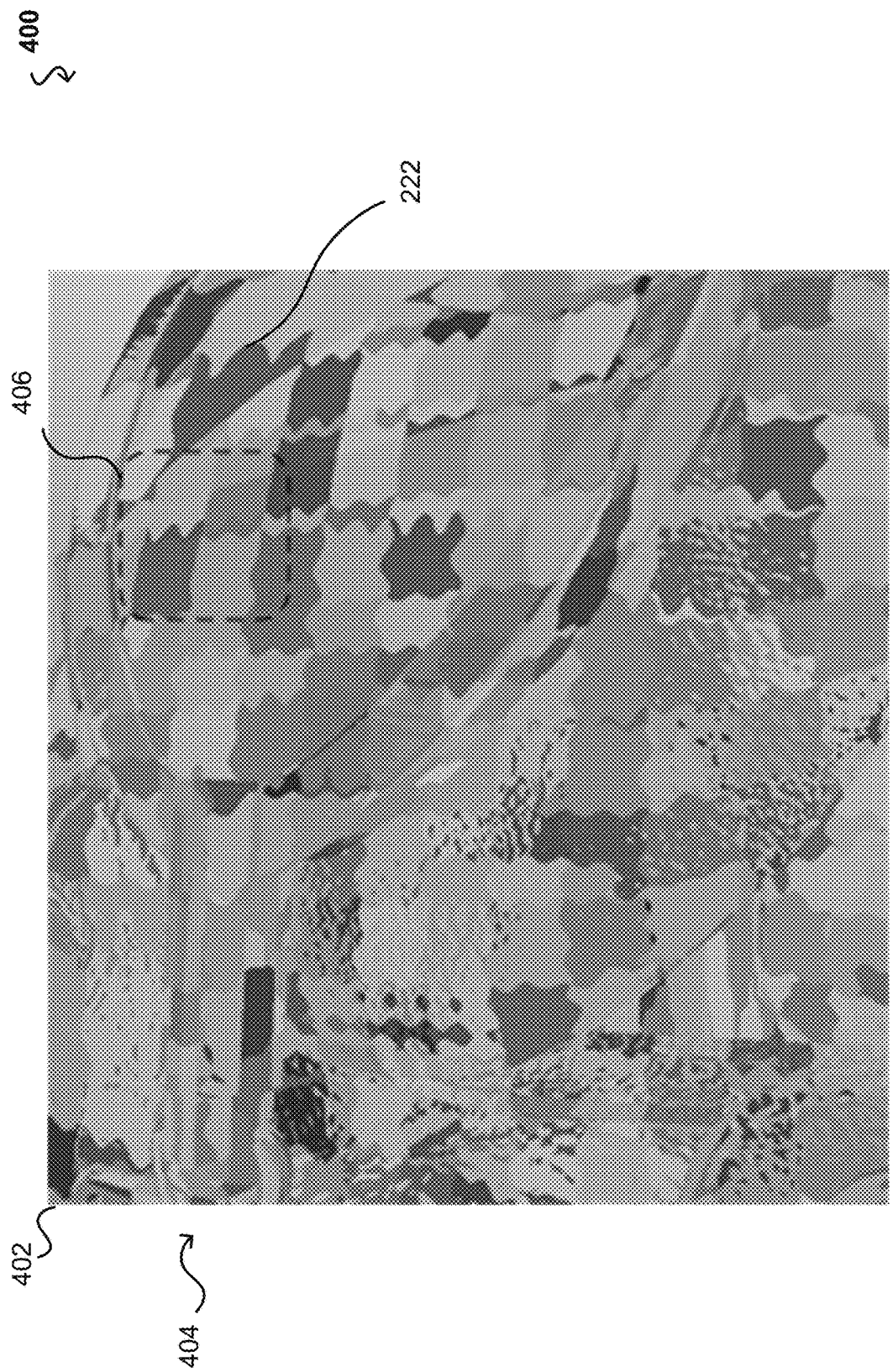
FIG. 4 illustrates an example of an image including a set of hash cells with shifted edges, according to at least one embodiment.

FIG. 4 is a representation 400 of an image frame 402 including a set of voxels 404 that have been rendered to include the shifted edges 222. The voxels 404 may also be computed and evaluated using mathematical formulas and the graphical representation 400 is provided as an illustrative example, but during rendering or processing, the representation 400 may not be generated and the locations of the voxels 404 may be represented mathematically. In this example, there are a variety of different voxel sizes, edge shapes, and/or the like, thereby further illustrating that voxel sizes may be determined based on various variables that may or may not include information associated with the shifted edges 222. Furthermore, different voxels along a common surface may be different sizes, as shown in a highlighted section 406, which includes a portion of the set of voxels 404, where individual voxels within the set of voxels 404 have different sizes and different shapes for their respective shifted edges 222.

Various embodiments of the present disclosure are directed toward shifting—e.g., periodically shifting, coordinates for each axis of a 3D voxel in world space. For example, spatial hashing techniques may incorporate discretizing the 3D coordinates of various points, and as a result, embodiments may then be used to shift those points using parity functions to generate the various shifted edges, that may include those points. In at least one embodiment, a voxel size may be known or determined. A position of a selected point is then identified and its index is then determined by identifying where the point lies.

In certain embodiments, voxel sizes may be based at least on a relative position of a given point along a Z-axis with respect to a user's viewpoint of an object. That is, for closer portions of the object, there may be more numbers of smaller voxels than for portions of objects a farther distance from the user's viewpoint. Additionally, surface complexity may also be used to adjust a voxel size, where a less complex surface, like a flat smooth surface, uses fewer voxels that are larger in size as compared to a curved surface having a surface texture. In at least one embodiment, there is a continuous size difference based on distances along the Z-axis. However, in various other embodiments, there may be a discrete size difference or voxel sizes may be based on various other factors or percentages of their surroundings, among other options.

Figure 5:
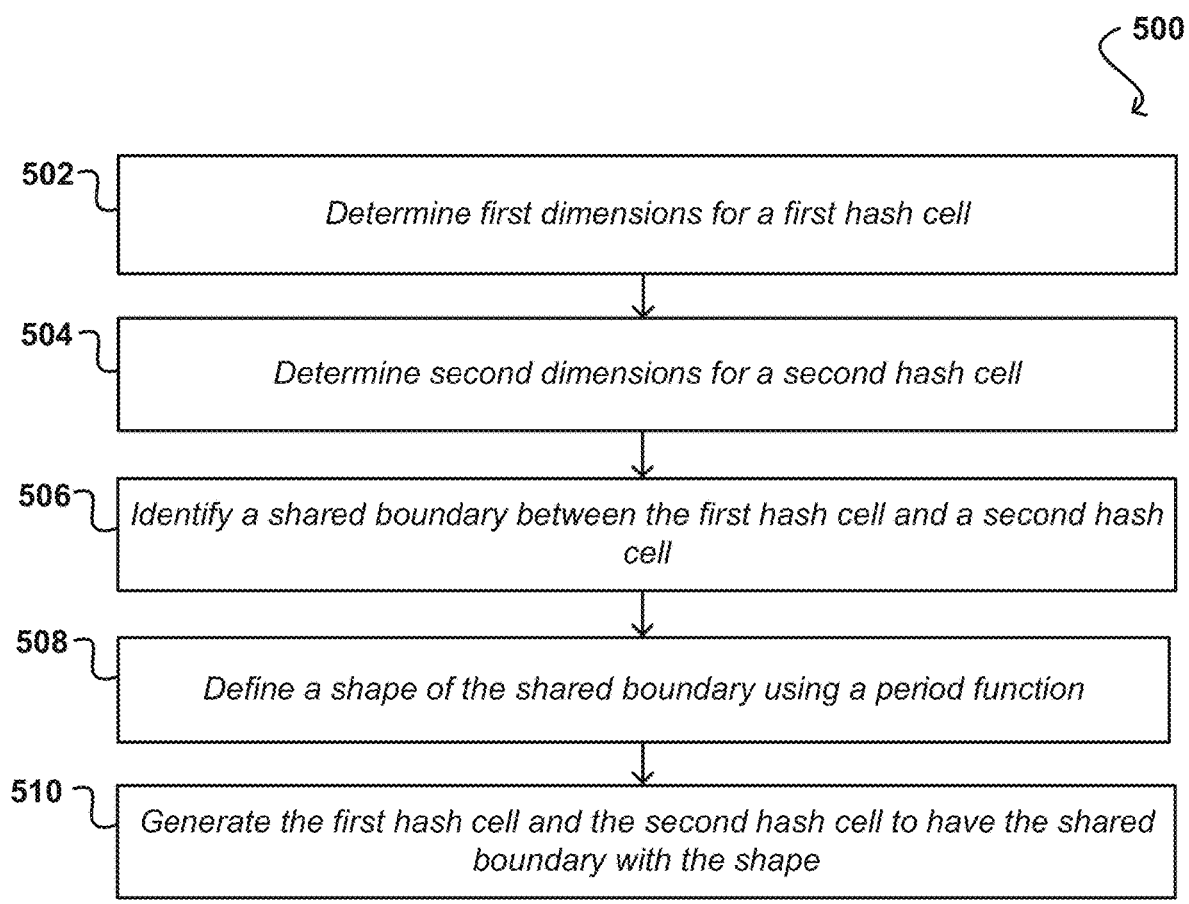
FIG. 5 illustrates an example flow chart of a process for generating hash cells with a shared boundary, according to at least one embodiment.

FIG. 5 illustrates an example process 500 for generating hash cells. It should be understood that for this and other processes presented herein that there can be additional, fewer, or alternative operations performed in similar or alternative order, or at least partially in parallel, within the scope of various embodiments unless otherwise specifically stated. In this example, first dimensions for a first hash cell are determined 502. For example, a length of a side of the hash cell or an overall volume may be determined. In at least one embodiment, the first dimensions may be associated with one or more features of an underlying object in an image associated with a hash cell, such as a surface texture of a complexity of the object. Furthermore, in various embodiments, a hash cell's position on a Z-axis with respect to a viewer's point of view may be used, at least in part, to determine the first dimensions. Second dimensions for a second hash cell may also be determined 504. Different factors may be used for the determinations of each of the hash cells, and moreover, the hash cells may not be the same size. For example, one hash cell may have a greater length along one of the X-axis, the Y-axis, and/or the Z-axis. Additionally, different hash cells may not have the same shapes, but may have a similar volume and/or 2D area.

A shared boundary between the first hash cell and the second hash cell may be identified 506. The shared boundary may correspond to a location where the first and second hash cells abut one another, at least in part. Additionally, in various embodiments, the shared boundary may correspond to a region where one or more portions of the first and/or second hash cells overlap one another. The shared boundary may not extend for an entire length or side of both the first hash cell and the second hash cell so that only a portion of the hash cell side may share a boundary with only a portion of the adjacent hash cell.

As noted herein, it may be undesirable for points of the boundary to be coplanar, and this undesirability may be more evidence when the common plane is associated with an edge or sharp feature of an underlying object. Accordingly, various embodiments shift or otherwise modify a shape of the shared boundary to reduce a number of points that are arranged along a common plane. A shape of the shared boundary may be defined 508. In at least one embodiment, the shape is defined by a periodic function. The shape may vary along different axial directions of the first hash cell and/or the second hash cell so that different periodic functions, or different inputs to define shapes of the periodic functions, are used along one or more of the X-axis, the Y-axis, and/or the Z-axis. In at least one embodiment, the periodic functions are chosen so that they are not a multiple of an original discretization.

Periodic functions for a point (p) may be defined along each of an X-axis, a Y-axis, and a Z-axis. A function may be selected, such as a sine or cosine function, as two non-limiting examples, and may receive, as an input, the location of the point along with an adjustment factor, which may include a given value, such as a cell size, divided by some constant. This adjustment factor may vary based on different factors or properties of the image to be rendered. Thereafter, the point may be shifted. In at least one embodiment, shifting a point along a given axis may include adding, to a first pixel location, the sum of the periodic functions of the other two axes multiplied by a shifting factor. In at least one embodiment, the shifting factor is a fraction of the cell size, but may, in other embodiments, be various other values. In this manner, for various pixels in each hash cell, periodic shifting may adjust a position of one or more points visible through one or more pixels forming the boundary to reduce a number of cell boundary points that fall along a common plane.

In at least one embodiment, the defined shape is used to generate the first hash cell and the second hash cell so that the shared boundary corresponds to the shape 510. Accordingly, there is a reduced likelihood that cell boundary falls along scene surfaces, which may reduce flickering or other artifact generation.

Figure 6:
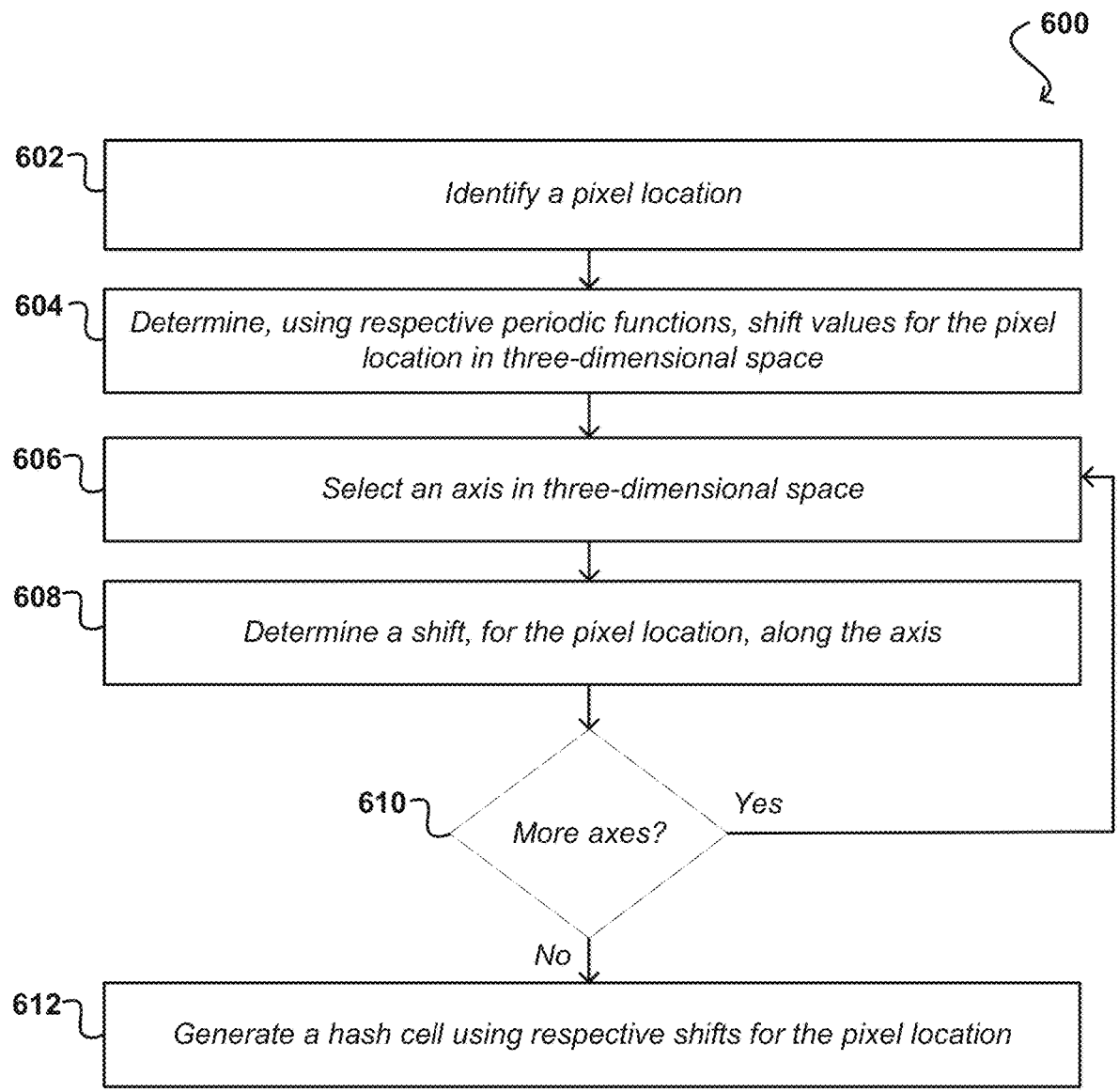
FIG. 6 illustrates an example flow chart of a process for determining a shifted location for a point along a cell boundary, according to at least one embodiment.

FIG. 6 illustrates an example process 600 for determining a shifted pixel location. In this example, a pixel location is identified 602, which may also be referred to as a point. The point may be along a boundary of one or more hash cells that are discretized to form a series of axis-aligned cubes. One or more shift values may be determined for the point 604. The shift values may correspond to a value associated with a periodic function that takes, as an input, the pixel location along with one or more adjustment factors or terms, which may be constants or based at least on properties of the hash cell. For example, in at least one embodiment, the adjustment factor may include the cell size divided by a given constant.

Various embodiments are used with hash cells in three-dimensional space positioned along an X-axis, a Y-axis, and a Z-axis. An axis within the three-dimensional space may be selected 606 and then a shift, for the pixel location along the selected axis, may be determined 608. In at least one embodiment, the shift corresponds to a new location for the pixel location and may correspond to the original pixel location plus the shift values in the other non-selected axes. It may then be determined if there are more axes 610, and if so, additional shifts may be calculated for the pixel location along each axis. If not, then a hash cell is generated using the respective shifts to change a position of the pixel location 612. As noted, generation of the hash cell may be represented visually/graphically and/or mathematically without a visible output.

Data Center

Figure 7:
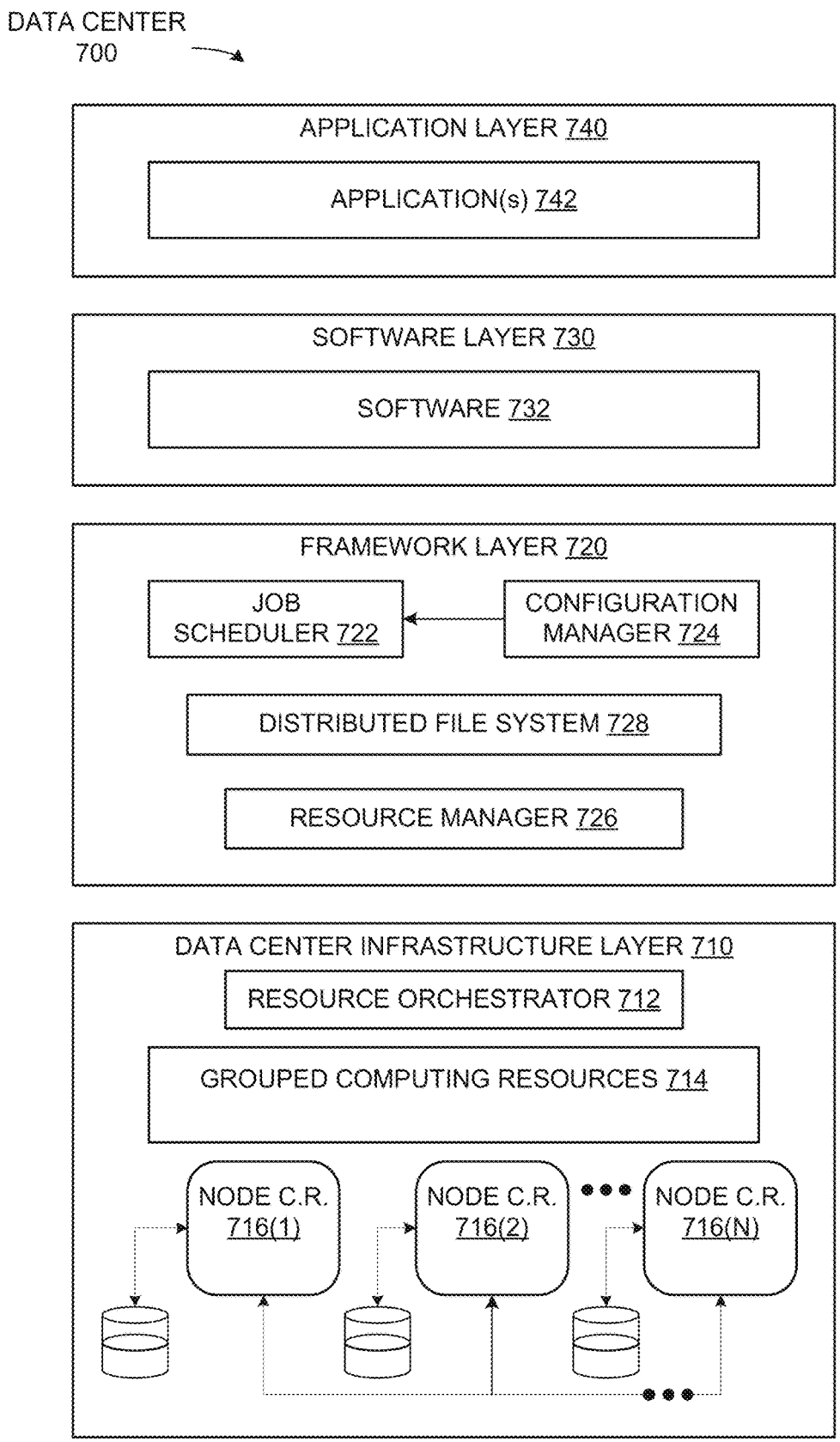
FIG. 7 illustrates an example data center system, according to at least one embodiment.

FIG. 7 illustrates an example data center 700, in which at least one embodiment may be used. In at least one embodiment, data center 700 includes a data center infrastructure layer 710, a framework layer 720, a software layer 730, and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). Separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 716(1)-716(N) and/or grouped computing resources 714. In at least one embodiment, resource orchestrator 712 may include a software design infrastructure ("SDI") management entity for data center 700. In at least one embodiment, resource orchestrator may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may use distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resource 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 728 of framework layer 720. The one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 728 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underused and/or poor performing portions of a data center.

In at least one embodiment, data center 700 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Such components can be used for light transport simulations.

Computer Systems

Figure 8:
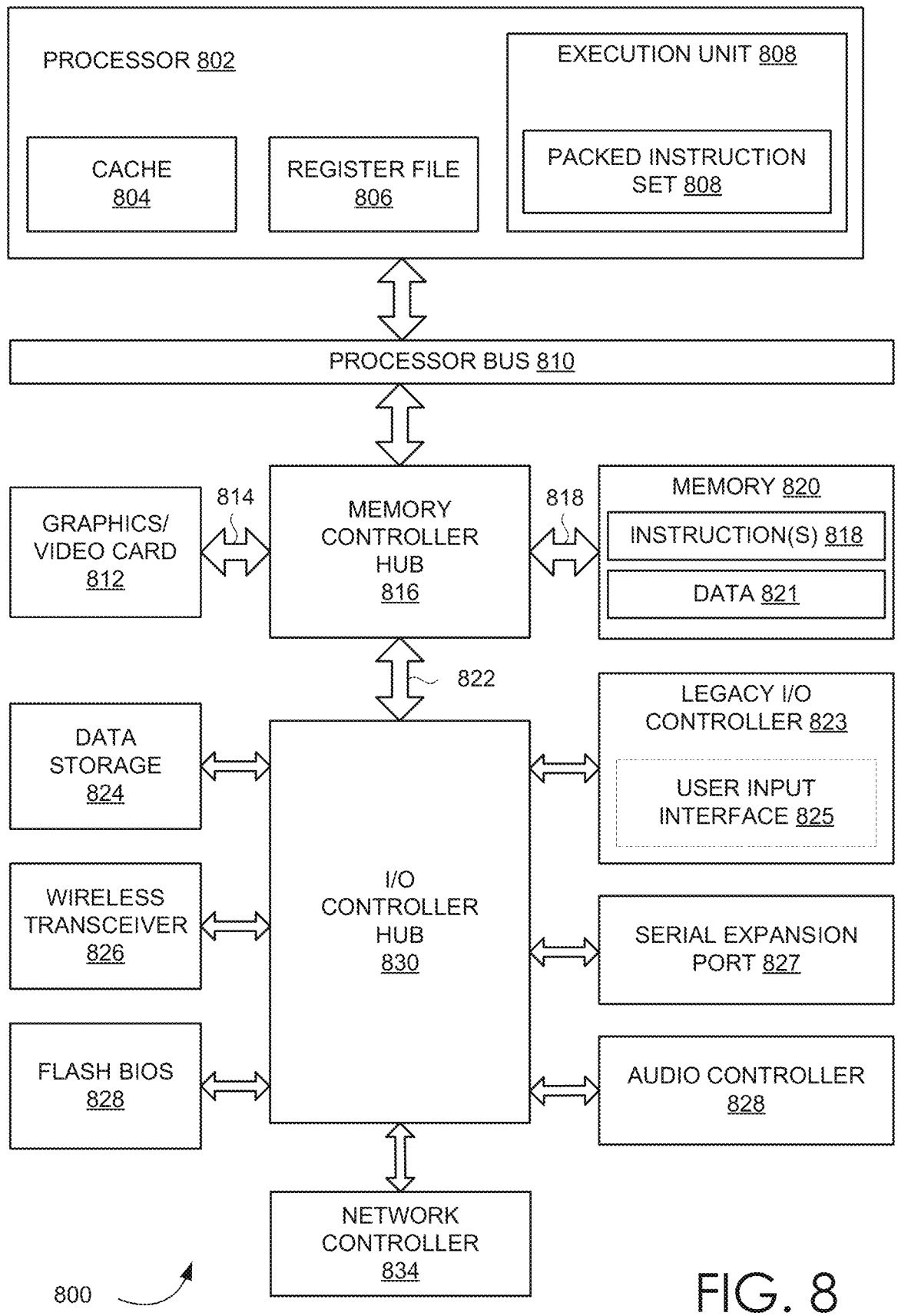
FIG. 8 illustrates a computer system, according to at least one embodiment.

FIG. 8 is a block diagram illustrating an exemplary computer system, which may be a system with interconnected devices and components, a system-on-a-chip (SOC) or some combination thereof 800 formed with a processor that may include execution units to execute an instruction, according to at least one embodiment. In at least one embodiment, computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), edge computing devices, set-top boxes, network hubs, wide area network ("WAN") switches, or any other system that may perform one or more instructions in accordance with at least one embodiment.

Embodiments of the systems and methods described herein may be used for a variety of purposes, by way of example and without limitation, for machine control, machine locomotion, machine driving, synthetic data generation, digital twinning, model training, perception, augmented reality, virtual reality, mixed reality, robotics, security and surveillance, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be incorporated or integrated in a variety of different systems such as automotive systems (e.g., a human-machine interface for an autonomous or semi-autonomous machine), systems implemented using a robot, aerial systems, medial systems, boating systems, smart area monitoring systems, systems for performing deep learning operations, systems for performing simulation and digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, register file 806 may store different types of data in various registers including, without limitation, integer registers, floating point registers, status registers, and instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor 802, along with associated circuitry to execute instructions, operations used by many multimedia applications may be performed using packed data in a general-purpose processor 802. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be implemented as a Dynamic Random Access Memory ("DRAM") device, a Static Random Access Memory ("SRAM") device, flash memory device, or other memory device. In at least one embodiment, memory 820 may store instruction(s) 819 and/or data 821 represented by data signals that may be executed by processor 802.

In at least one embodiment, system logic chip may be coupled to processor bus 810 and memory 820. In at least one embodiment, system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O 822. In at least one embodiment, system logic chip may provide a graphics port for coupling to a graphics controller. In at least one embodiment, MCH 816 may be coupled to memory 820 through a high bandwidth memory path 818 and graphics/video card 812 may be coupled to MCH 816 through an Accelerated Graphics Port ("AGP") interconnect 814.

In at least one embodiment, computer system 800 may use system I/O 822 that is a proprietary hub interface bus to couple MCH 816 to I/O controller hub ("ICH") 830. In at least one embodiment, ICH 830 may provide direct connections to some I/O devices via a local I/O bus. In at least one embodiment, local I/O bus may include, without limitation, a high-speed I/O bus for connecting peripherals to memory 820, chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as Universal Serial Bus ("USB"), and a network controller 834. Data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips", whereas in other embodiments, FIG. 8 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 800 are interconnected using compute express link (CXL) interconnects.

Such components can be used for light transport simulations.

Figure 9:
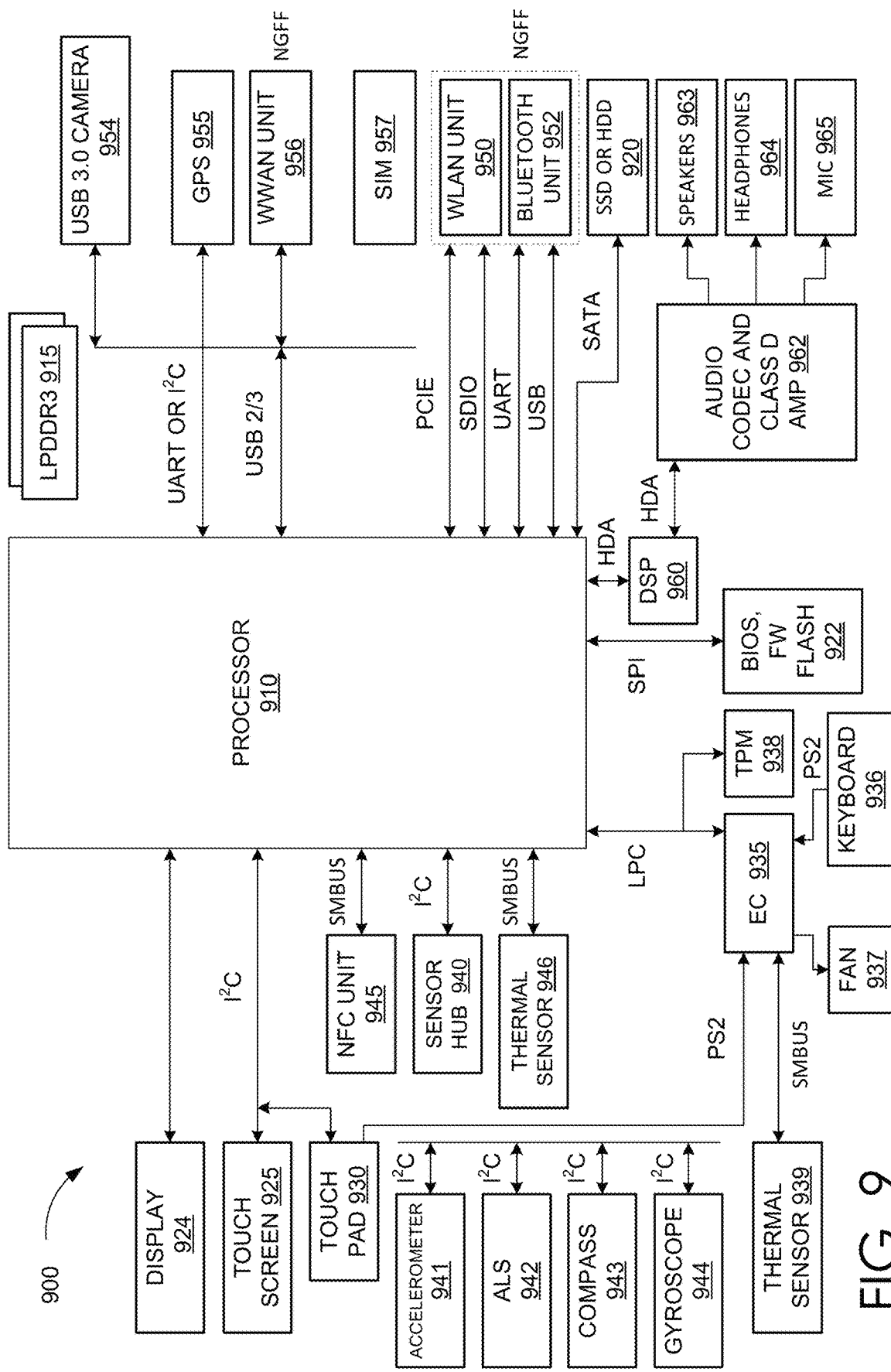
FIG. 9 illustrates a computer system, according to at least one embodiment.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, or any other suitable electronic device.

In at least one embodiment, system 900 may include, without limitation, processor 910 communicatively coupled to any suitable number or kind of components, peripherals, modules, or devices. In at least one embodiment, processor 910 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) 955, a camera ("USB 3.0 camera") 954 such as a USB 3.0 camera, and/or a Low Power Double Data Rate ("LPDDR") memory unit ("LPDDR3") 915 implemented in, for example, LPDDR3 standard. These components may each be implemented in any suitable manner.

In at least one embodiment, other components may be communicatively coupled to processor 910 through components discussed above. In at least one embodiment, an accelerometer 941, Ambient Light Sensor ("ALS") 942, compass 943, and a gyroscope 944 may be communicatively coupled to sensor hub 940. In at least one embodiment, thermal sensor 939, a fan 937, a keyboard 946, and a touch pad 930 may be communicatively coupled to EC 935. In at least one embodiment, speaker 963, headphones 964, and microphone ("mic") 965 may be communicatively coupled to an audio unit ("audio codec and class d amp") 962, which may in turn be communicatively coupled to DSP 960. In at least one embodiment, audio unit 964 may include, for example and without limitation, an audio coder/decoder ("codec") and a class D amplifier. In at least one embodiment, SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Such components can be used for light transport simulations.

Figure 10:
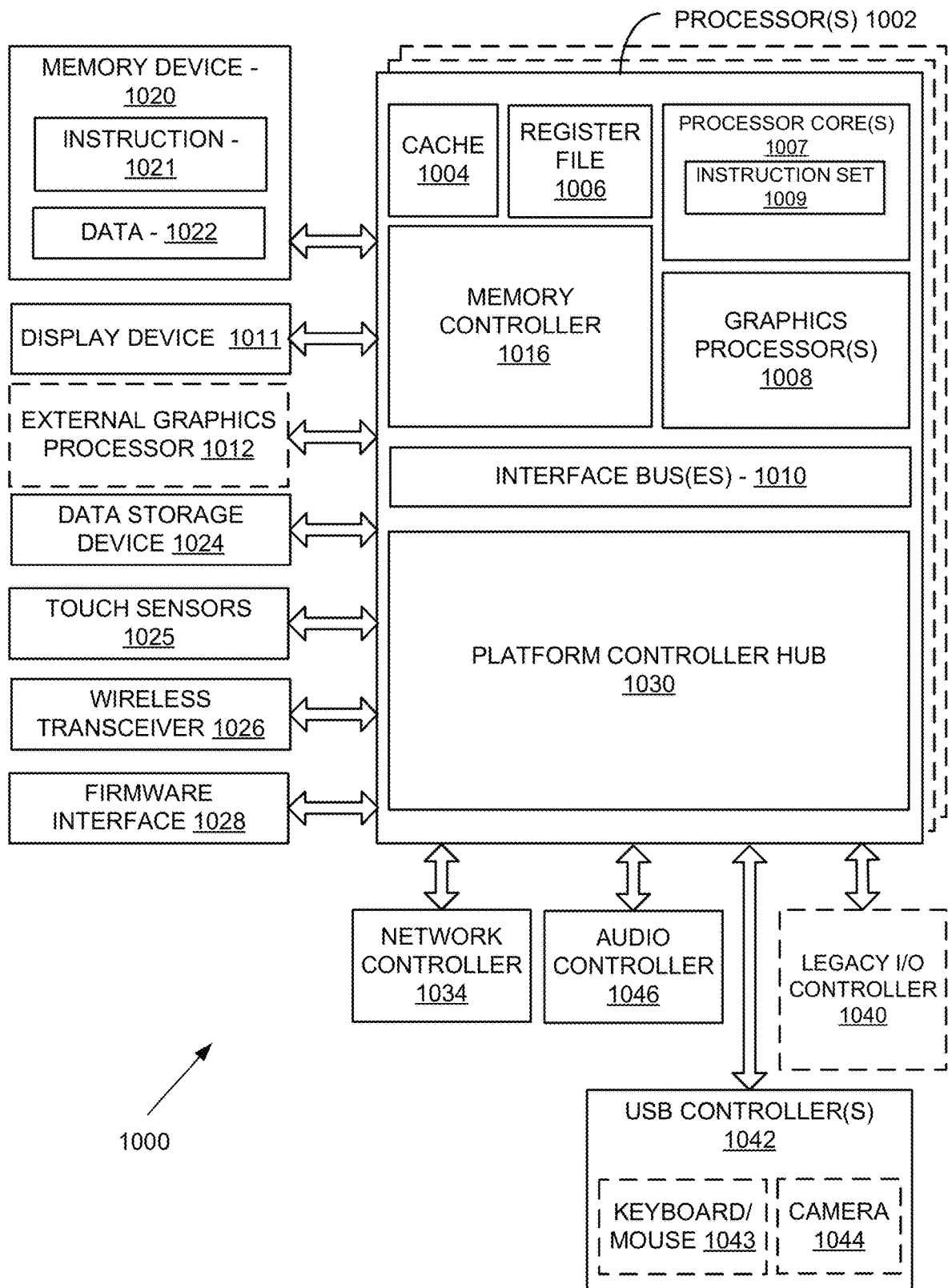
FIG. 10 illustrates at least portions of a graphics processor, according to one or more embodiments.

FIG. 10 is a block diagram of a processing system, according to at least one embodiment. In at least one embodiment, system 1000 includes one or more processors 1002 and one or more graphics processors 1008, and may be a single processor desktop system, a multiprocessor workstation system, or a server system or datacenter having a large number of collectively or separably managed processors 1002 or processor cores 1007. In at least one embodiment, system 1000 is a processing platform incorporated within a system-on-a-chip (SoC) integrated circuit for use in mobile, handheld, or embedded devices.

In at least one embodiment, system 1000 can include, or be incorporated within a server-based gaming platform, a cloud computing host platform, a virtualized computing platform, a game console, including a game and media console, a mobile gaming console, a handheld game console, or an online game console. In at least one embodiment, system 1000 is a mobile phone, smart phone, tablet computing device or mobile Internet device. In at least one embodiment, processing system 1000 can also include, couple with, or be integrated within a wearable device, such as a smart watch wearable device, smart eyewear device, augmented reality device, edge device, Internet of Things ("IoT") device, or virtual reality device. In at least one embodiment, processing system 1000 is a television or set top box device having one or more processors 1002 and a graphical interface generated by one or more graphics processors 1008.

In at least one embodiment, one or more processors 1002 each include one or more processor cores 1007 to process instructions which, when executed, perform operations for system and user software. In at least one embodiment, each of one or more processor cores 1007 is configured to process a specific instruction set 1009. In at least one embodiment, instruction set 1009 may facilitate Complex Instruction Set Computing (CISC), Reduced Instruction Set Computing (RISC), or computing via a Very Long Instruction Word (VLIW). In at least one embodiment, processor cores 1007 may each process a different instruction set 1009, which may include instructions to facilitate emulation of other instruction sets. In at least one embodiment, processor core 1007 may also include other processing devices, such a Digital Signal Processor (DSP).

In at least one embodiment, processor 1002 includes cache memory 1004. In at least one embodiment, processor 1002 can have a single internal cache or multiple levels of internal cache. In at least one embodiment, cache memory is shared among various components of processor 1002. In at least one embodiment, processor 1002 also uses an external cache (e.g., a Level-3 (L3) cache or Last Level Cache (LLC)) (not shown), which may be shared among processor cores 1007 using known cache coherency techniques. In at least one embodiment, register file 1006 is additionally included in processor 1002 which may include different types of registers for storing different types of data (e.g., integer registers, floating point registers, status registers, and an instruction pointer register). In at least one embodiment, register file 1006 may include general-purpose registers or other registers.

In at least one embodiment, one or more processor(s) 1002 are coupled with one or more interface bus(es) 1010 to transmit communication signals such as address, data, or control signals between processor 1002 and other components in system 1000. In at least one embodiment, interface bus 1010, in one embodiment, can be a processor bus, such as a version of a Direct Media Interface (DMI) bus. In at least one embodiment, interface 1010 is not limited to a DMI bus, and may include one or more Peripheral Component Interconnect buses (e.g., PCI, PCI Express), memory busses, or other types of interface busses. In at least one embodiment processor(s) 1002 include an integrated memory controller 1016 and a platform controller hub 1030. In at least one embodiment, memory controller 1016 facilitates communication between a memory device and other components of system 1000, while platform controller hub (PCH) 1030 provides connections to I/O devices via a local I/O bus.

In at least one embodiment, memory device 1020 can be a dynamic random access memory (DRAM) device, a static random access memory (SRAM) device, flash memory device, phase-change memory device, or some other memory device having suitable performance to serve as process memory. In at least one embodiment memory device 1020 can operate as system memory for system 1000, to store data 1022 and instructions 1021 for use when one or more processors 1002 executes an application or process. In at least one embodiment, memory controller 1016 also couples with an optional external graphics processor 1012, which may communicate with one or more graphics processors 1008 in processors 1002 to perform graphics and media operations. In at least one embodiment, a display device 1011 can connect to processor(s) 1002. In at least one embodiment display device 1011 can include one or more of an internal display device, as in a mobile electronic device or a laptop device or an external display device attached via a display interface (e.g., DisplayPort, etc.). In at least one embodiment, display device 1011 can include a head mounted display (HMD) such as a stereoscopic display device for use in virtual reality (VR) applications or augmented reality (AR) applications.

In at least one embodiment, platform controller hub 1030 enables peripherals to connect to memory device 1020 and processor 1002 via a high-speed I/O bus. In at least one embodiment, I/O peripherals include, but are not limited to, an audio controller 1046, a network controller 1034, a firmware interface 1028, a wireless transceiver 1026, touch sensors 1025, a data storage device 1024 (e.g., hard disk drive, flash memory, etc.). In at least one embodiment, data storage device 1024 can connect via a storage interface (e.g., SATA) or via a peripheral bus, such as a Peripheral Component Interconnect bus (e.g., PCI, PCI Express). In at least one embodiment, touch sensors 1025 can include touch screen sensors, pressure sensors, or fingerprint sensors. In at least one embodiment, wireless transceiver 1026 can be a Wi-Fi transceiver, a Bluetooth transceiver, or a mobile network transceiver such as a 3G, 4G, or Long Term Evolution (LTE) transceiver. In at least one embodiment, firmware interface 1028 enables communication with system firmware, and can be, for example, a unified extensible firmware interface (UEFI). In at least one embodiment, network controller 1034 can enable a network connection to a wired network. In at least one embodiment, a high-performance network controller (not shown) couples with interface bus 1010. In at least one embodiment, audio controller 1046 is a multi-channel high definition audio controller. In at least one embodiment, system 1000 includes an optional legacy I/O controller 1040 for coupling legacy (e.g., Personal System 2 (PS/2)) devices to system. In at least one embodiment, platform controller hub 1030 can also connect to one or more Universal Serial Bus (USB) controllers 1042 connect input devices, such as keyboard and mouse 1043 combinations, a camera 1044, or other USB input devices.

In at least one embodiment, an instance of memory controller 1016 and platform controller hub 1030 may be integrated into a discreet external graphics processor, such as external graphics processor 1012. In at least one embodiment, platform controller hub 1030 and/or memory controller 1016 may be external to one or more processor(s) 1002. For example, in at least one embodiment, system 1000 can include an external memory controller 1016 and platform controller hub 1030, which may be configured as a memory controller hub and peripheral controller hub within a system chipset that is in communication with processor(s) 1002.

Such components can be used for light transport simulations.

Figure 11:
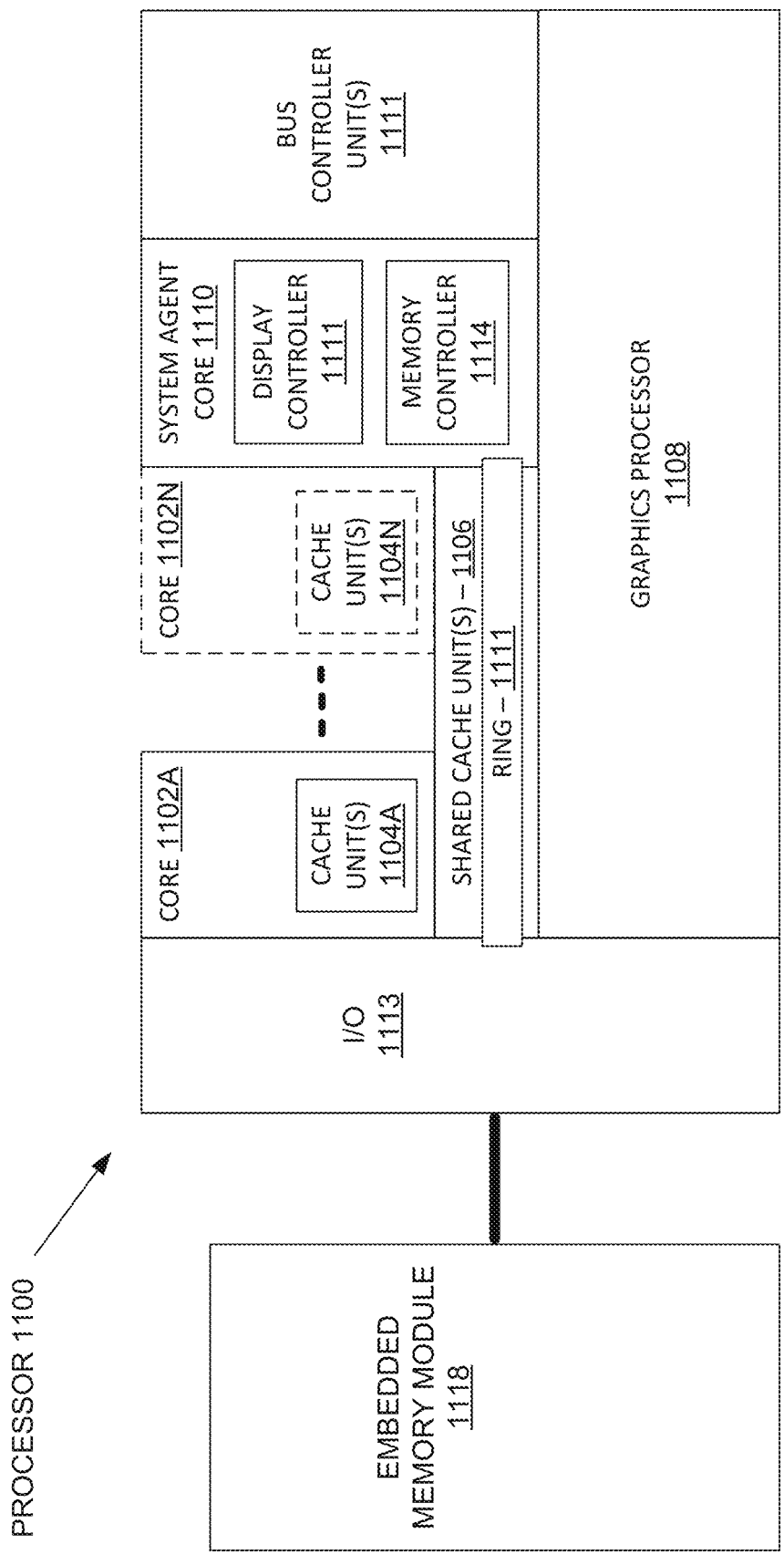
FIG. 11 illustrates at least portions of a graphics processor, according to one or more embodiments.

FIG. 11 is a block diagram of a processor 1100 having one or more processor cores 1102A-1102N, an integrated memory controller 1114, and an integrated graphics processor 1108, according to at least one embodiment. In at least one embodiment, processor 1100 can include additional cores up to and including additional core 1102N represented by dashed lined boxes. In at least one embodiment, each of processor cores 1102A-1102N includes one or more internal cache units 1104A-1104N. In at least one embodiment, each processor core also has access to one or more shared cached units 1106.

In at least one embodiment, internal cache units 1104A-1104N and shared cache units 1106 represent a cache memory hierarchy within processor 1100. In at least one embodiment, cache memory units 1104A-1104N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1106 and 1104A-1104N.

In at least one embodiment, processor 1100 may also include a set of one or more bus controller units 1116 and a system agent core 1110. In at least one embodiment, one or more bus controller units 1116 manage a set of peripheral buses, such as one or more PCI or PCI express busses. In at least one embodiment, system agent core 1110 provides management functionality for various processor components. In at least one embodiment, system agent core 1110 includes one or more integrated memory controllers 1114 to manage access to various external memory devices (not shown).

In at least one embodiment, one or more of processor cores 1102A-1102N include support for simultaneous multi-threading. In at least one embodiment, system agent core 1110 includes components for coordinating and operating cores 1102A-1102N during multi-threaded processing. In at least one embodiment, system agent core 1110 may additionally include a power control unit (PCU), which includes logic and components to regulate one or more power states of processor cores 1102A-1102N and graphics processor 1108.

In at least one embodiment, processor 1100 additionally includes graphics processor 1108 to execute graphics processing operations. In at least one embodiment, graphics processor 1108 couples with shared cache units 1106, and system agent core 1110, including one or more integrated memory controllers 1114. In at least one embodiment, system agent core 1110 also includes a display controller 1111 to drive graphics processor output to one or more coupled displays. In at least one embodiment, display controller 1111 may also be a separate module coupled with graphics processor 1108 via at least one interconnect, or may be integrated within graphics processor 1108.

In at least one embodiment, a ring based interconnect unit 1112 is used to couple internal components of processor 1100. In at least one embodiment, an alternative interconnect unit may be used, such as a point-to-point interconnect, a switched interconnect, or other techniques. In at least one embodiment, graphics processor 1108 couples with ring interconnect 1112 via an I/O link 1113.

In at least one embodiment, I/O link 1113 represents at least one of multiple varieties of I/O interconnects, including an on package I/O interconnect which facilitates communication between various processor components and a high-performance embedded memory module 1118, such as an eDRAM module. In at least one embodiment, each of processor cores 1102A-1102N and graphics processor 1108 use embedded memory modules 1118 as a shared Last Level Cache.

In at least one embodiment, processor cores 1102A-1102N are homogenous cores executing a common instruction set architecture. In at least one embodiment, processor cores 1102A-1102N are heterogeneous in terms of instruction set architecture (ISA), where one or more of processor cores 1102A-1102N execute a common instruction set, while one or more other cores of processor cores 1102A-1102N executes a subset of a common instruction set or a different instruction set. In at least one embodiment, processor cores 1102A-1102N are heterogeneous in terms of microarchitecture, where one or more cores having a relatively higher power consumption couple with one or more power cores having a lower power consumption. In at least one embodiment, processor 1100 can be implemented on one or more chips or as an SoC integrated circuit.

Such components can be used for light transport simulations.

At least one embodiment of the disclosure can be described in view of the following clauses:

1. A system, comprising:
  one or more processing units to:
  determine, for a three-dimensional (3D) space partitioned as a plurality of hash cells, first dimensions for a first hash cell of the plurality of hash cells;
  determine second dimensions for a second hash cell of the plurality of hash cells;
  define a shape of a shared boundary between the first hash cell and the second hash cell using a set of periodic functions;
  modify at least one of the first hash cell or the second hash cell based at least on the shape of the shared boundary; and
  perform one or more operations using at least one of the first hash cell or the second hash cell.

2. The system of clause 1, wherein the one or more processing units are further to modify at least one of the first hash cell or the second hash cell by shifting coordinates of at least one of the first hash cell or the second hash cell along the shared boundary by a factor of a cell size.

3. The system of clause 1, wherein at least one periodic function of the set of period functions is one of a sine function or a cosine function.

4. The system of clause 1, wherein contact points of the first hash cell and the second hash cell along the shared boundary are positioned in different planes of the 3D space.

5. The system of clause 1, wherein the one or more processing units are further to generate a visualization of at least a portion of the 3D space using one or more light transport simulation operations.

6. The system of clause 1, wherein the first dimensions and the second dimensions are determined, at least, for spatial hashing a region to be rendered.

7. The system of clause 1, wherein the one or more processing units are further to determine a first periodic function for a first axis, a second periodic function for a second axis, and a third periodic function for a third axis, and further wherein the set of periodic functions includes at least one of the first periodic function, the second periodic function, or the third periodic function.

8. The system of clause 1, wherein the system is comprised in at least one of:
  a human-machine interface system of an autonomous or semi-autonomous machine;
  a system for performing conversational AI operations;
  a system for generating or presenting at least one of augmented reality content, virtual reality content, or mixed reality content;
  a system for performing simulation operations;
  a system for performing digital twin operations;
  a system for performing deep learning operations;
  a system implemented using an edge device;
  a system implemented using a robot;
  a system incorporating one or more virtual machines (VMs);
  a system implemented at least partially in a data center; or
  a system implemented at least partially using cloud computing resources.

9. A method, comprising:
  partitioning a multi-dimensional space into a plurality of cells;
  generating a plurality of updated cells based at least on shifting, using a set of one or more periodic functions, one or more points forming respective boundaries of the plurality of cells; and
  generating a visual representation of at least a portion of the multi-dimensional space using one or more light transport simulation operations on at least a portion of the space that includes at least one updated cell of the plurality of updated cells.

10. The method of clause 9, wherein the set of one or more periodic functions is designated for two or more coordinate axes of the space.

11. The method of clause 9, wherein an individual set of one or more periodic functions for an individual point includes two or more different periodic functions.

12. The method of clause 9, wherein a respective shift for an individual point is based at least on an initial point location and on one or more periodic functions corresponding to the individual point in at least two different axis directions.

13. The method of clause 12, wherein the respective shift is based at least on a cell size.

14. The method of clause 9, further comprising:
  determining a first shift value for an individual point along a first axis;
  determining a second shift value for the individual point along a second axis;
  determining a third shift value for the individual point along a third axis; and
  determining an individual point location based at least on an initial point location, the first shift value, the second shift value, and the third shift value.

15. The method of clause 14, wherein the set of one or more periodic functions includes at least one of a sine wave or a cosine wave.

16. A processor comprising:
  one or more processing units to:
    partition a multi-dimensional space into a number of cells;
    identify respective cell boundaries for two or more individual cells of the number of cells;
    shift the respective cell boundaries based at least on executing a selected periodic function; and generate a visual representation of at least a portion of the multi-dimensional space using one or more light transport simulation operations on at least a portion of the space that includes at least one cell of the number of cells with a shifted cell boundary.

17. The processor of clause 16, wherein the one or more processing units are further to select a wavelength for the periodic function.

18. The processor of clause 17, wherein the wavelength is based at least on an axis of the respective cell boundary.

19. The processor of clause 18, wherein a first axis corresponds to a first periodic function, a second axis corresponds to a second periodic function, and a third axis corresponds to a third periodic function, and the selected periodic function is selected from one or more of the first periodic function, the second periodic function, or the third periodic function.

20. The processor of clause 16, wherein the processor is comprised in at least one of:
a human-machine interface system of an autonomous or semi-autonomous machine;
a system for performing conversational AI operations;
a system for generating or presenting at least one of augmented reality content, virtual
reality content, or mixed reality content;
a system for performing simulation operations;
a system for performing digital twin operations;
a system for performing deep learning operations;
a system implemented using an edge device;
a system implemented using a robot;
a system incorporating one or more virtual machines (VMs);
a system implemented at least partially in a data center; or
a system implemented at least partially using cloud computing resources.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (e.g., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") and/or a data processing unit ("DPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be any processor capable of general purpose processing such as a CPU, GPU, or DPU. As non-limiting examples, "processor" may be any microcontroller or dedicated processing unit such as a DSP, image signal processor ("ISP"), arithmetic logic unit ("ALU"), vision processing unit ("VPU"), tree traversal unit ("TTU"), ray tracing core, tensor tracing core, tensor processing unit ("TPU"), embedded control unit ("ECU"), and the like. As non-limiting examples, "processor" may be a hardware accelerator, such as a PVA (programmable vision accelerator), DLA (deep learning accelerator), etc. As non-limiting examples, "processor" may also include one or more virtual instances of a CPU, GPU, etc., hosted on an underlying hardware component executing one or more virtual machines. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system, comprising:
one or more processing units to:
determine, for a three-dimensional (3D) space partitioned as a plurality of hash cells, first dimensions for a first hash cell of the plurality of hash cells;
determine second dimensions for a second hash cell of the plurality of hash cells;
define a shape of a shared boundary between the first hash cell and the second hash cell using a set of periodic functions;
modify at least one of the first hash cell or the second hash cell based at least on the shape of the shared boundary; and
generate a visualization of at least a portion of the 3D space by performing one or more light transport simulation operations using at least one of the first hash cell or the second hash cell.

2. The system of claim 1, wherein the one or more processing units are further to modify at least one of the first hash cell or the second hash cell by shifting coordinates of at least one of the first hash cell or the second hash cell along the shared boundary by a factor of a cell size.

3. The system of claim 1, wherein at least one periodic function of the set of periodic functions is one of a sine function or a cosine function.

4. The system of claim 1, wherein contact points of the first hash cell and the second hash cell along the shared boundary are positioned in different planes of the 3D space.

5. The system of claim 1, wherein the first dimensions and the second dimensions are determined, at least, for spatial hashing a region to be rendered.

6. The system of claim 1, wherein the one or more processing units are further to determine a first periodic function for a first axis, a second periodic function for a second axis, and a third periodic function for a third axis, and further wherein the set of periodic functions includes at least one of the first periodic function, the second periodic function, or the third periodic function.

7. The system of claim 1, wherein the system is comprised in at least one of:
- a human-machine interface system of an autonomous or semi-autonomous machine;
- a system for performing conversational AI operations;
- a system for generating or presenting at least one of augmented reality content, virtual reality content, or mixed reality content;
- a system for performing simulation operations;
- a system for performing digital twin operations;
- a system for performing deep learning operations;
- a system implemented using an edge device;
- a system implemented using a robot;
- a system incorporating one or more virtual machines (VMs);
- a system implemented at least partially in a data center; or
- a system implemented at least partially using cloud computing resources.

8. A method, comprising:
partitioning a multi-dimensional space into a plurality of cells;
generating a plurality of updated cells based at least on shifting, using a set of one or more periodic functions, one or more points forming respective boundaries of the plurality of cells; and
generating a visual representation of at least a portion of the multi-dimensional space using one or more light transport simulation operations on at least the portion of the multi-dimensional space that includes at least one updated cell of the plurality of updated cells.

9. The method of claim 8, wherein the set of one or more periodic functions is designated for two or more coordinate axes of the multi-dimensional space.

10. The method of claim 8, wherein an individual set of one or more periodic functions for an individual point includes two or more different periodic functions.

11. The method of claim 8, wherein a respective shift for an individual point is based at least on an initial point location and on one or more periodic functions corresponding to the individual point in at least two different axis directions.

12. The method of claim 11, wherein the respective shift is based at least on a cell size.

13. The method of claim 8, further comprising:
determining a first shift value for an individual point along a first axis;
determining a second shift value for the individual point along a second axis;
determining a third shift value for the individual point along a third axis; and
determining an individual point location based at least on an initial point location, the first shift value, the second shift value, and the third shift value.

14. The method of claim 13, wherein the set of one or more periodic functions includes at least one of a sine wave or a cosine wave.

15. A processor comprising:
one or more processing units to:
partition a multi-dimensional space into a number of cells;
identify respective cell boundaries for two or more individual cells of the number of cells;
shift the respective cell boundaries based at least on executing a selected periodic function; and
generate a visual representation of at least a portion of the multi-dimensional space using one or more light transport simulation operations on at least the portion of the multi-dimensional space that includes at least one cell of the number of cells with a shifted cell boundary.

16. The processor of claim 15, wherein the one or more processing units are further to select a wavelength for the periodic function.

17. The processor of claim 16, wherein the wavelength is based at least on an axis of the respective cell boundary.

18. The processor of claim 17, wherein a first axis corresponds to a first periodic function, a second axis corresponds to a second periodic function, and a third axis corresponds to a third periodic function, and the selected periodic function is selected from one or more of the first periodic function, the second periodic function, or the third periodic function.

19. The processor of claim 15, wherein the processor is comprised in at least one of:
- a human-machine interface system of an autonomous or semi-autonomous machine;
- a system for performing conversational AI operations;
- a system for generating or presenting at least one of augmented reality content, virtual reality content, or mixed reality content;
- a system for performing simulation operations;
- a system for performing digital twin operations;
- a system for performing deep learning operations;
- a system implemented using an edge device;
- a system implemented using a robot;
- a system incorporating one or more virtual machines (VMs);
- a system implemented at least partially in a data center; or
- a system implemented at least partially using cloud computing resources.

* * * * *